United States Patent [19]

Labbe

[11] 4,370,882

[45] Feb. 1, 1983

[54] VEHICLE FRAME STRAIGHTENING APPARATUS

[76] Inventor: Claude Labbe, Duson, La. 70529

[21] Appl. No.: 223,582

[22] Filed: Jan. 9, 1981

Related U.S. Application Data

[60] Division of Ser. No. 925,373, Jul. 17, 1978, Pat. No. 4,247,966, which is a continuation of Ser. No. 740,052, Jan. 8, 1976, abandoned.

[51] Int. Cl.³ .......................................... B21D 1/12
[52] U.S. Cl. ...................................... 72/447; 72/705
[58] Field of Search .............................. 72/447, 705

[56] References Cited

U.S. PATENT DOCUMENTS

| | | | |
|---|---|---|---|
| 2,522,167 | 9/1950 | Englehart | 72/705 |
| 2,559,250 | 7/1951 | Jackson | 72/705 |
| 2,563,527 | 8/1951 | Gingrich et al. | 72/705 |
| 2,717,020 | 9/1955 | Dobias | 72/705 |
| 3,050,099 | 8/1962 | Smith | 72/705 |
| 3,149,659 | 9/1964 | Bogert, Jr. | 72/705 |
| 3,269,169 | 8/1966 | Latuff et al. | 72/447 |
| 3,377,834 | 4/1968 | Latuff et al. | 72/705 |
| 3,496,757 | 2/1970 | Wanpouille | 72/705 |
| 3,581,547 | 6/1971 | Estigarribia | 72/705 |
| 3,625,047 | 12/1971 | Lunardini | 72/705 |
| 3,698,230 | 10/1972 | Buske | 72/705 |
| 3,927,550 | 12/1975 | Samuelsson | 72/447 |
| 4,138,876 | 2/1979 | Chisum | 72/705 |

FOREIGN PATENT DOCUMENTS

| | | | |
|---|---|---|---|
| 249933 | 10/1963 | Australia | 72/705 |
| 1332498 | 10/1973 | United Kingdom | 72/705 |
| 1373287 | 11/1974 | United Kingdom | 72/705 |

OTHER PUBLICATIONS

"Hour Power Catalog", Buske Industries, 1977, p. 5.

*Primary Examiner*—Lowell A. Larson
*Attorney, Agent, or Firm*—C. Emmett Pugh

[57] ABSTRACT

An apparatus for straightening damaged automobile frames or bodies utilizing a rigid structural ramp capable of supporting a vehicle. A preferably hydraulic power source capable of imparting alternatively a compressive or a tensile force to the damaged frame or body is adjustably mounted on a wheeled post which slideably travels a continuous track circumventing the ramp. The ramp is provided with improved chain anchoring openings. A chain can be used for a applying tensile force to the frame directly or indirectly to the frame by connecting a chain first to the anchoring opening, then to the damaged frame, and then to the hydraulic power source.

Using two wheeled posts on the continuous track, a rotatable, pivotal, cross bar can be attached at its respective end portions to the wheeled posts. With the power source mounted on the cross bar, repairs can be made to the roof, or interior portions of an automobile.

15 Claims, 10 Drawing Figures

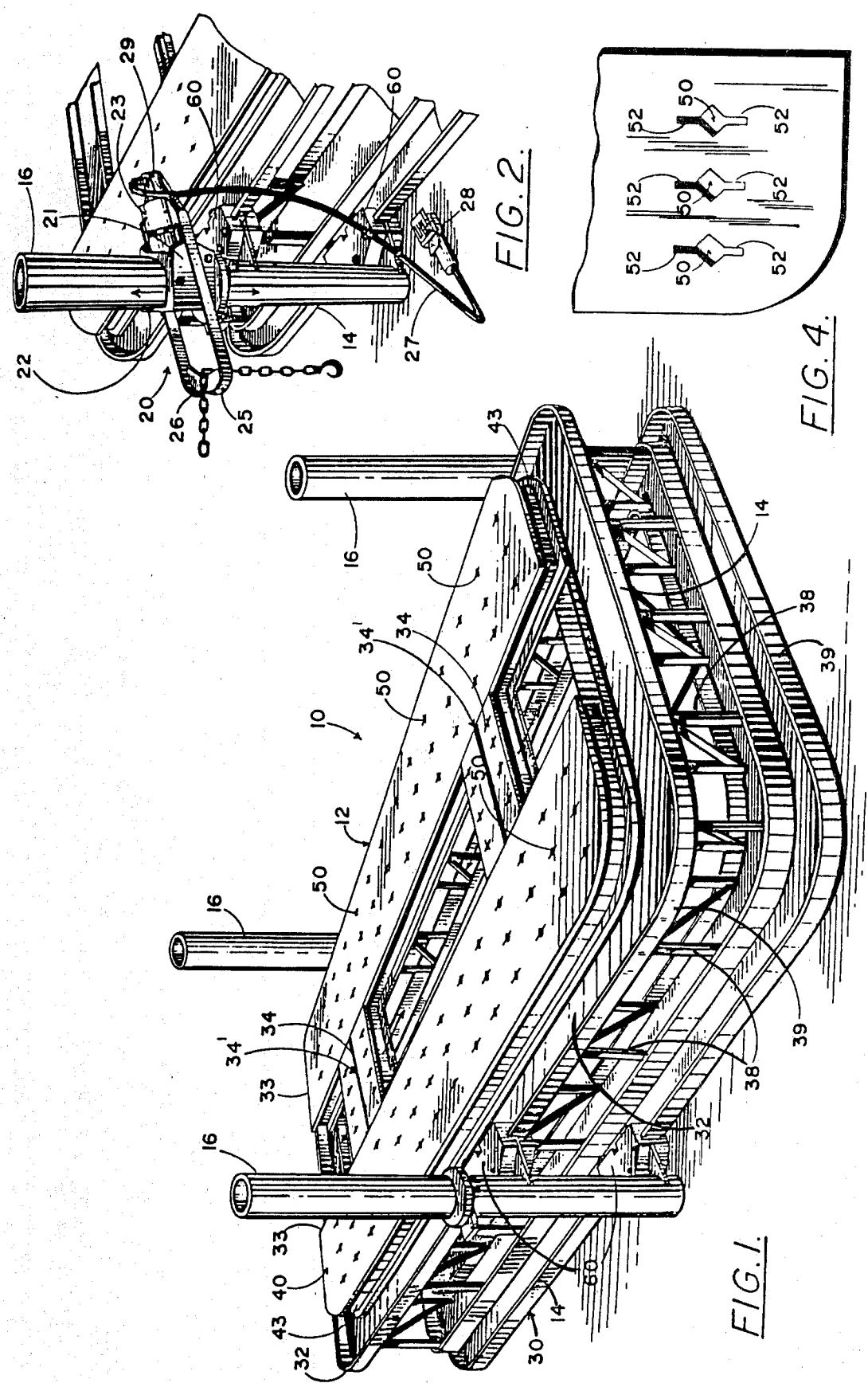

VEHICLE FRAME STRAIGHTENING APPARATUS

REFERENCE TO RELATED APPLICATIONS

This application is a division of Ser. No. 925,373 filed July 17, 1978, now U.S. Pat. No. 4,247,966, issued Feb. 3, 1981, which in turn was a continuation of Ser. No. 740,052 filed Jan. 8, 1976, now abandoned in favor of the later application.

BACKGROUND OF THE INVENTION

1. Field of the Invention

This invention relates to the repair of wrecked automobile or other vehicles bodies and frames, in which restoration of bent parts is effected by a force applied to appropriately attached chains and anchors, oriented at substantially any desired angle.

2. Prior Art

Several devices for straightening automobile frames have been patented, and typical examples thereof are listed in the following table:

| PRIOR ART PATENTS | | |
|---|---|---|
| U.S. PAT. NO. | INVENTOR(S) | ISSUE DATE |
| 2,717,020 | G. L. Dobias | 9/6/55 |
| 3,269,169 | J. J. Latuff, et al | 8/30/66 |
| 3,377,834 | J. J. Latuff, et al | 4/16/68 |
| 3,518,867 | R. J. Rouis | 7/7/70 |
| 3,623,353 | D. Dinerman | 11/30/71 |
| 3,626,747 | R. J. Rouis | 12/14/71 |
| 3,630,066 | F. L. Chisum | 12/28/71 |
| 3,754,427 | W. E. Hunnycutt, et al | 8/28/73 |

These prior art devices attempt to solve the problem of straightening damaged auto frames in a variety of ways. Some devices have complex ramps which are oriented in different positions to obtain a desired relation between the power source and the ramp. Other devices have complex pully systems with multiple changes in the direction of an applied pulling cable or chain between the power source and the damaged frame. Most devices can only apply tensile forces to the damaged parts. Generally, only easily accessible frame parts can be repaired.

The method of anchoring chain, hooks and the like in the structural support portion of these devices is often unsafe and inadequate. The present invention provides an automobile straightening apparatus which comprises a fixed, rugged structural ramp capable of supporting an automobile or truck to be repaired.

3. General Discussion of the Present Invention

The frame has chain anchoring openings which allow the auto to be doubly and safely secured to the frame by lengths of chain. At least one power source is provided on a tall, wheeled post which travels a continuous track encircling the frame. The power source is pivotally and slidably adjustable on the wheeled post and can impart both compressive and tensile forces directly to a damaged automobile frame or body secured to the structural ramp. Indirect forces can also be applied to the frame first, then to the structural ramp.

The ramp can be mounted in a recessed pit, allowing for easy transfer of vehicles by simply driving on or off the ramp.

Two wheeled posts can be mounted on the track, and a cross bar pivotally attached at its respective end portions to the posts. If desired, a power source can be mounted on the cross bar for additional body repairs (for example, to the interior portion of an automobile, see FIG. 10).

The apparatus of the present invention thus eliminates the prior art problems and shortcomings in a simple manner.

DESCRIPTION OF THE DRAWINGS

For a further understanding of the nature and objects of the present invention, reference should be had to the following detailed description, taken in conjunction with the accompanying drawings, in which like parts are given like references, and wherein:

FIG. 1 is a perspective view of the ramp, continuous track, and wheeled posts of the apparatus of the present invention.

FIG. 2 is a perspective view of the preferred embodiment of the power means of the apparatus of the present invention.

FIG. 4 is a plan view of a partial section of the ramp of the apparatus of the present invention showing the chain anchoring openings therein.

DETAILED DESCRIPTION OF THE PREFERRED EMBODIMENT

Structure

Figure 6:
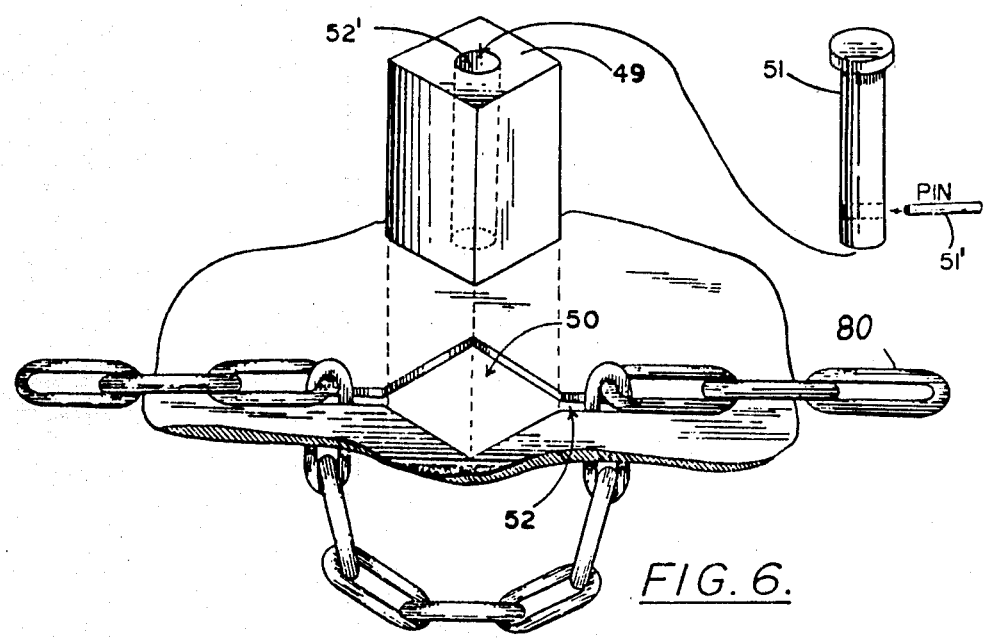
FIG. 6 is a perspective of the chain anchoring opening of the present invention showing a conventional length of chain anchored therein.

As can best be seen in FIG. 1-2, the apparatus for straightening damaged automobile frames of the present invention, designated generally by the numeral 10, is comprised of a rigid structural frame 12, provided with a continuous encircling track 14, having a plurality of wheeled posts 16, slideably traveling upon the track 14. A preferably hydraulic power source or assembly, designated generally by the numeral 20 (see FIG. 2), is adjustably mounted on each of the wheeled posts 16. Frame 12 is substantially rectangular having a structural base 30 supporting an upper vehicle platform 32. Platform 32 is comprised of a pair of ramps 33 separated by a pair of struts 34 providing a distance between ramps 33 which preferably corresponds to the width of a conventional automobile, truck or the like. Struts 34 can be telescopically mounted to ramps 33, and ramps 33 slideable on platform 32, thus providing adjustability of ramps 33 to give a desired dimensional space between them. The overall length likewise preferably corresponds to the overall dimension of a conventional automobile or like vehicle being sufficient to accomodate the same. Each strut 34 has a central slot 34' therethrough. Slot 34' having a width of ½ to 4 inches allows the use of anchoring of hooks (not shown) for the securing of axles on the damaged auto. Struts 34 are slideably mounted (see arrows, FIG. 1) between ramps 33, allowing adjustment for different wheel base lengths. Thus struts 34 can be placed directly under the axles of any sized wheelbase truck, car or the like.

Horizontally oriented I-beams (not shown) can be welded to frame 12, preferably perpendicular to ramps 33, in for example, spaced pairs, having a gap of, for example, from one to three inches between them. This allows anchoring chains or pins to be fastened to the I-beams, or a conventional jack to be placed thereon (for the purpose of raising a damaged vehicle). Each ramp 33 is provided with an upper surface 40 and a lower surface (not shown). The upper surface 40 and lower surface, of ramps 33 are spaced and supported in the spaced arrangement by sidewall 43. This provides an air space (not shown) between the upper surface 40 and lower surface (not shown) of each ramp 33. Each ramp 33 is provided with a plurality of openings 50 for anchoring a conventional chain or the like therein. Openings 50 are preferably diamond shaped or square, having opposite open ended slots 52 on preferably two opposite diagonal corners, as can best be seen in FIGS. 4 and 7. If openings 50 are diamonds, slots 52 are on the longer dimensional diagonal corners. Struts 34 can also have openings 50. Base 30 is constructed entirely below the plane of the upper surface 40 of ramps 32. This prevents interference by structural members with the operation of power source 20 mounted on wheel posts 16. Base 30 is supportably connected to platform 32 by a plurality of struts 38. The outer edge of base 30 and platform 32 are provided with continuous outer lips 39. Lips 39 in cooperation with the outer edge portion of base 30 and platform 32 produce a pair of tracks 14 which slideably support each wheeled post 16.

Wheeled post 16 is provided with a pair of skates 60 which are rigidly connected to the middle and lower portions of portions respectively of posts 16. Skates 60 are provided with inner rollers (not shown). Skates 60 are slideably mounted on tracks 14 such that the inner rollers of skates 60 allow skates 60 to slideably travel along tracks 14. Thus, wheeled posts 16 can be moved around the perimeter of the rigid structural support frame 12 of the apparatus of the present invention designated by the numeral 10. This allows the power assembly 20 to be located at virtually any position along the edge of a damaged automobile frame which is placed on the upper surface 40 of ramps 33 for repair purposes.

In the preferred embodiment of the apparatus of the present invention, power source assembly 20 is adjustably mounted on each wheeled post 16 allowing upward and downward movement of power source assembly 20 on post 16 (see arrows, FIG. 2). Power source assembly 20 is comprised generally of a central support sleeve 21 having a central opening 22 therein which allows support sleeve 21 to fit slideably on post 16. Each power source 20 is provided with a hydraulic jack 23 pivotally connected to central support sleeve 21. Pull arm 25 is rigidly attached to jack 23, forming associated rigid means therewith, such that the entire assembly of jack 23 and pull arm 25 pivots on support sleeve (see arrow, FIG. 2). The end portion of pull arm 25, which is opposite hydraulic jack 23 is provided with a chain engaging slot 26. A power line or conduit 27 can be attached to hydraulic jack 23 and controlled by means of a foot pedal 28. A pressure head 29 is provided at the opposite end portion of power source 20 from pull arm 25. This provides an additional feature of allowing a compressive force to be applied to the auto frame at a desired spot upon extension of jack 23, to repair dents, bends or the like.

Figure 7:
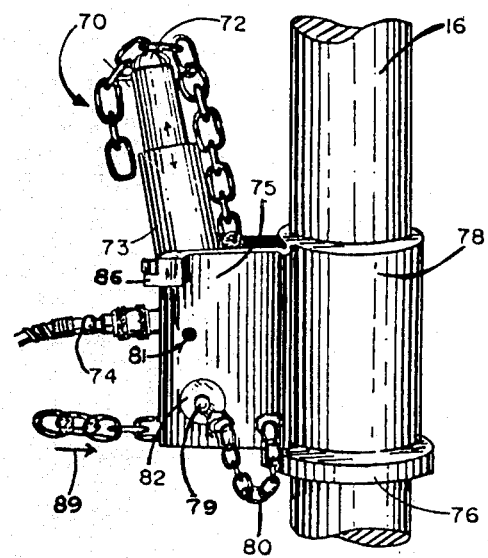
FIG. 7 is a side elevational view of an alternative embodiment of the jack assembly of the apparatus of the present invention.
Figure 8:
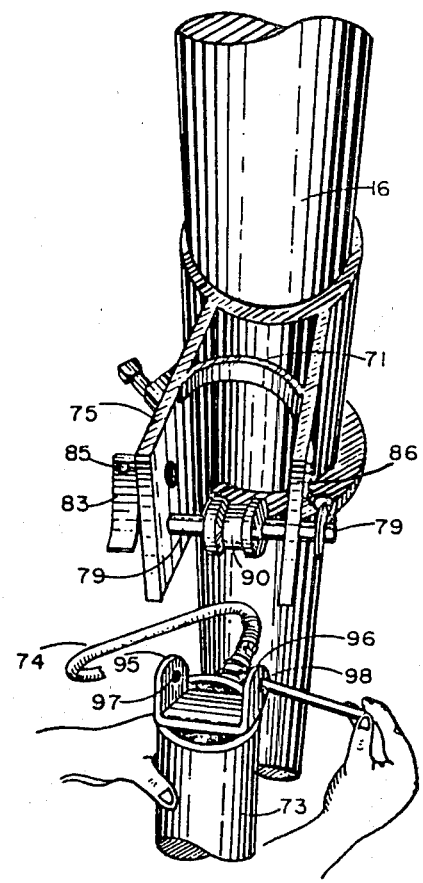
FIG. 8 is a perspective view of the alternative embodiment of the jack assembly of the apparatus of the present invention with the jack disassembled from its mounting bracket.
Figure 9:
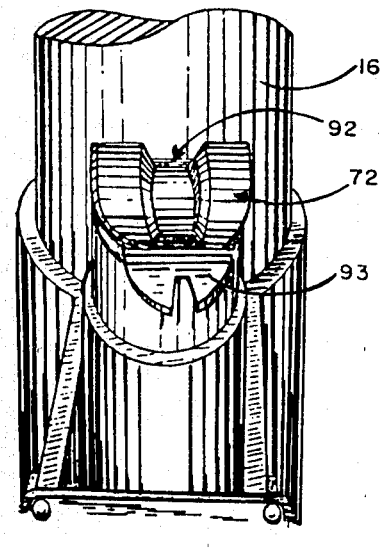
FIG. 9 is a perspective view of the alternative embodiment of the jack assembly of the apparatus of the present invention showing the head portion of the jack.

FIGS. 7–9 illustrate an alternative embodiment of the power source of the apparatus of the present invention. As can best be seen by FIG. 7, power source assembly designated generally by the numeral 70 is comprised of a jack 73 pivotally mounted about pin 79 in adjustable bracket 78 which is slideably, rotatably mounted on post 16. Stop 76 is provided to fixedly attach and secure the position along post 16 of bracket 78. Bracket 78 is provided with a bifurcated frame section 75 having an internal rest 71. Rest 71 is generally arcuate in shape corresponding to the circular configuration of jack 73. Jack 73 is mounted in the frame section 75 of bracket 78 by means of pin 79 which slideably fits in aperture 82 of bracket 78. A safety chain 80 is attached to pin 79 thereby suspendedly holding pin 79 at bracket 78 when not in use. Roller guide 90 (see FIG. 8) is rotatably mounted on pin 79 between jack supports 95, 96. When jack 73 is in its operational position, roller guide 90 is rotatably mounted on pin 85 in between jack supports 95 and 96. Apertures 97 and 98 in corresponding supports 95, 96 allow pin 79 to mount slideably therethrough. Clamp 83 is pivotally mounted on frame 75 of bracket 78 at pin 85. Catch 86 is provided so that clamp 83 may be latched in catch 86 to hold jack 73 in an upright position (see FIG. 7). Hydraulic source 74 is connectable to jack 73 so that the necessary hydraulic fluid can be supplied to jack 73 for the operation thereof.

Jack 73 is provided with a head portion 72 as can best be seen in FIGS. 7 and 8. Head 72 is provided with a trough section 92 and a chain anchoring tip 92 forming associated rigid means. The extreme tip of head 72 is enlarged to provide a structurally sound tip for the application of pressure to a desired point when jack 73 is extended. Thus, tensile and compressive forces can be imparted to the vehicle frame as needed using jack 73.

A conventional chain designated by the numeral 80 can be attached as shown in FIG. 7 by slideably forcing a link of chain 80 between the bifurcations of chain anchoring tip 93. Chain 80 is then wrapped over the upper part of head 72 guideably in trough 92. Chain 80 is then guided along the back section of jack 73 behind and under roller guide 90 then outwardly away from wheeled post 6 where it is attached to a damaged section of an automobile frame or to a frame first and then to a chain anchoring opening of the apparatus of the present invention. Extension of jack 73 will then provide a tensile force in chain 80 at point 89 (see arrow, FIG. 7).

Operation

To repair a damaged automobile frame, an automobile is driven or transported by other conventional means onto the upper support 12 of the apparatus of the present invention designated generally by the numeral 10. A wheel post 16 having power assembly 20 mounted thereon, is transported around track 14 to the desired location near the damaged portion of the automobile to be repaired. The operator decides on the proper angle of attachment of a conventional chain to the damaged frame so that the application of a tensile force to the chain at the desired angle will pull the damaged frame into its proper geometric configuration. Power assembly 20 can be moved upwardly or downwardly along post 16, rotated on post 16, and tilted to obtain the desired angle. A conventional chain is latched in slot 26 of pull arm 25. The opposite end of the chain is wrapped around the desired spot. When the proper adjustment is made, which is possible by upward, downward, and rotational movements of power source 20 on post 16 and pivotable movements of jack 23, the hydraulic jack 23 is activated departing a tensile force to the chain and hence to the damaged automobile frame.

Figure 5:
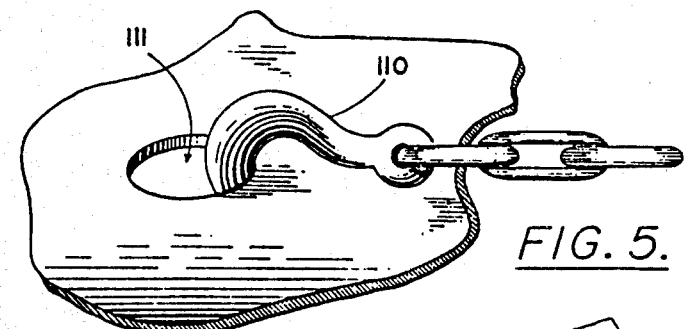
FIG. 5 is a perspective view of a prior art type anchoring opening.
Figure 3:
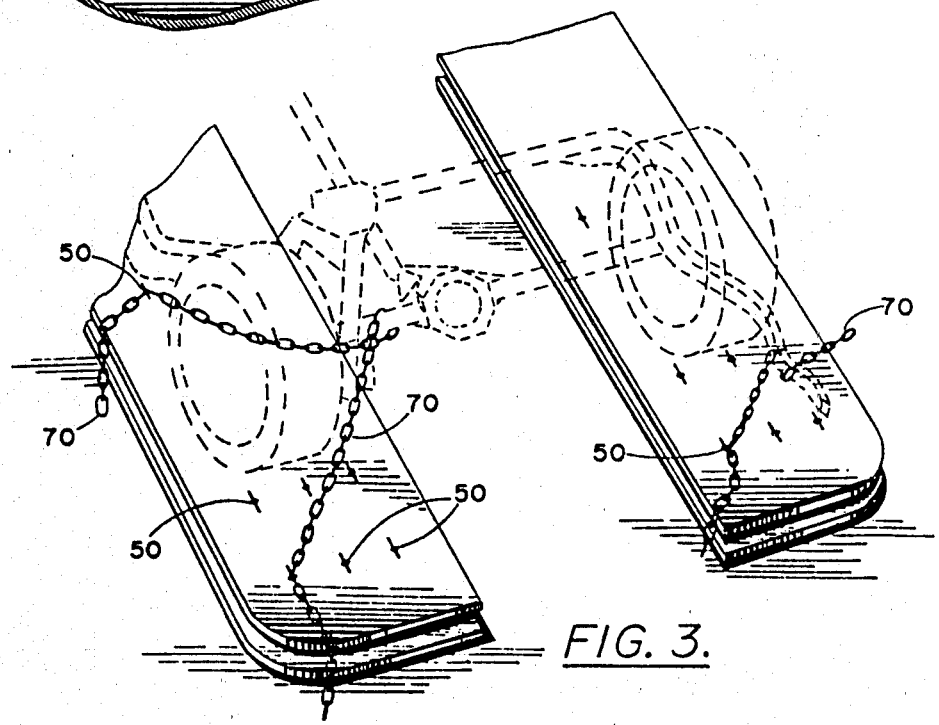
FIG. 3 is a partial perspective view of the ramp of the apparatus of the present invention showing an automobile frame anchored thereon.

For anchoring the frame to ramps 33, an additional length of chain 80 is anchored in any one of openings 50 covering ramps 33. As can best be seen by FIG. 6, chain 80 can be anchored twice in opening 50 by slideably engaging different links of chain 70 in the opposite respective slots 52 of opening 50. Peg 49 with a preferable cross sectional dimension corresponding to the cross sectional dimension of opening 50 can be inserted in opening 50 to prevent undesired removal of chain 80 from opening 50. Peg 49 can be secured in opening 50 using a conventional clamp, or by making peg 49 long enough so that its lower end stops on the lower surface of ramps 33 (not shown). Peg 49 can be provided with central aperature 49' through which holding pin 51 can be inserted and secured using stop pin 51'. If desired, a conventional pulley can be rigidly attached to the upper end portion of pin 51, so that chain 80 can be slideably attached to a given location for making downward pulls on an automobile frame or body. After this safe anchoring is completed, either end of chain 80 can then be wrapped around that portion of the automobile frame and likewise attached to another opening 50 as is shown in FIG. 6. This method of anchoring the automobile frame provides a safe and structurally sound anchoring of the frame during the straightening procedure. Openings 50 can provide anchoring spots for chains in other applications of the straightening procedure. For example, a length of chain can be anchored (as shown in FIG. 6) first to the ramp, then wrapped around the vehicle frame and then attached to power assembly 20 at pull arm 25 in slot 26. The means of anchoring a conventional chain 80 used in the straightening of automobile frames in conjunction with the power source is much safer than prior art methods for anchoring the chain as is illustrated in FIG. 5. The prior art method for anchoring a chain in the plate of an automobile straightening apparatus generally comprised a hook 110 secured in a circular opening 111. No method other than this singular attachment is provided. However, the present invention provides a double anchoring of the chain with a safety plug to prevent removal.

Operation of the alternative embodiment of the jack assembly of the apparatus of the present invention is best illustrated by FIGS. 7-9. Jack 73 is pivotally mounted in frame 75 of bracket 78. The pivotal mounting of jack 73 in bracket 78 allows movement of the jack from an upright vertical position (see FIG. 7) to a horizontal position if desired. This allows for a wide span of angles and adjustment with jack 73. In operation chain 80 is first hooked in anchoring tip 93 of head portion 72. Chain 80 is then wrapped over the upper part of head 72 guiding through trough 92 then chain 80 is threadably mounted behind and underneath roller guide 90 and then chain 80 can be outwardly projected for attachment to a desired portion of the damaged automobile frame. A hydraulic source 74 as can best be seen in FIG. 7 is attached to jack 73 and preferably operated by a conventional type foot switch. Operation of the hydraulic source moves the jack in an outwardly pistoned type fashion (see arrow, FIG. 7). Extension of jack 73 causes a tensile force to be imparted to chain 80 anchored to the head portion 72 of jack 73 thus pulling chain 80 upwardly along the longitudinal portion of jack 73 and inwardly below the roller guide 90. (See arrows, FIG. 7). Chain 80, anchored as needed to the vehicle frame, or to an opening first and then to the vehicle frame, conveys the tensile force to the damaged portion of the vehicle frame to make the desired repair. Alternatively, compressive forces can be applied directly with the head portion 72 of jack 73.

Figure 10:
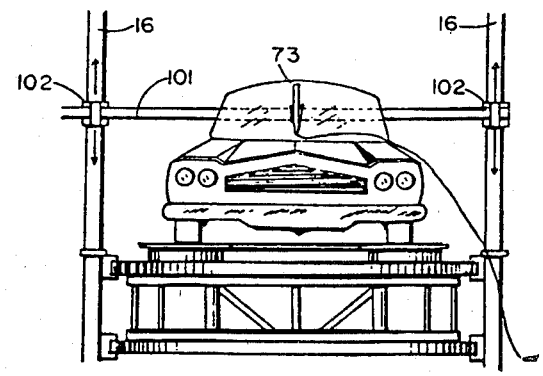
FIG. 10 is a perspective view of the apparatus of the present invention showing an alternative embodiment of the wheeled post and associated cross bar structural frame.

FIG. 10 illustrates an alternative embodiment utilizing a horizontal member rotatably and pivotally mounted at its respective end portions to any two of wheeled posts 16. This horizontally disposed member designated in FIG. 10 by the numeral 101 can accomodate either of the jack members of the present invention. Such a configuration allows the operator of the device of the present invention to mount either power source assembly 20 or jack 73 horizontally on cross member 101 and subsequently move the power means to the inner portion of an automobile for appropriate body or frame work on the interior portion of the automobile. A rotatable swiveling bracket designated by the numeral 102 is provided at the end portions of cross member 101 thereby allowing both vertical and horizontal movement of cross member 101 with respect to the top portion of frame support 12. Swiveling brackets 102 can be raised or lowered on wheel posts 16, or wheel post 16 can be moved on track 14 to give substantially any desired position to cross member 101 and jack 73 mounted thereon.

Since frame 12 provides two parallel ramps 33 on which an automobile can be mounted, the frame 12 can be utilized to align the frame. Thus frame alignment gauges (not shown) could be provided on ramps 33 for aligning a damaged automobile frame or the like, utilizing parallel ramps 33 as a reference.

Several dimensional changes are possible with the present invention to suit a variety of circumstances. Structural frame 10 can be manufactured in varying heights, and placed in pits varying in depth from, for example, one foot (and inclined ramps used to transport a vehicle to the frame 10) to three or more feet (requiring only a small horizontal ramp to the supporting frame 10. If space is a problem, only one-half of frame 10 could be constructed (such as would be provided by cutting frame 10 as shown in FIG. 1 perpendicular to its longitudinal axis) and a vehicle could be driven partly on, with its other half supported on the ground surfaace, outside the pit. In such a case, either end portion of the vehicle could be repaired by alternatively driving or backing the vehicle onto the structural frame.

Frame 12 is preferably constructed of any rigid structural material, e.g., steel, iron, wood or the like.

Because many varying and different embodiments may be made within the scope of the inventive concept taught herein, and because many modifications can be made in the embodiments detailed herein such details are to be interpreted as illustrative and not in a limiting sense.

What is claimed as invention is:

1. An apparatus for straightening damaged vehicle frames, comprising:
   a. a rigid structural ramp capable of supporting a vehicle thereon;
   b. a track at least partially surrounding said ramp;
   c. a wheeled post movably mounted on said track for movement on said track about said ramp;
   d. power means movably mounted on said post for imparting alternatively as desired a compressive force and a tensile force to the damaged frame, said power means being movable both in the horizontal and vertical planes with respect to said ramp and comprising a jack with a pressure head movably mounted on said wheel post, associated rigid means attached to said jack, and an elongated flexible member of high tensile strength attachable to said rigid means, said jack being easily convertible from a first compression position with said pressure head directed toward said ramp to a second tensile disposition, an extension of said jack being capable of applying a compression force through said pressure head to a vehicle on said ramp when said jack is in said first position, an extension of said jack also being capable of applying a tensile force to a vehicle on said ramp through said flexible means attached at one part of its length to the vehicle and attached at another part of its length to said rigid means attached to said jack when said jack is in said second disposition.

2. The apparatus of claim 1 wherein said power means is pivotally and rotatably mounted on said post.

3. The apparatus of claim 1, wherein said elongated flexible member comprises chain means for connecting said power means to the damaged frame when said jack is in said second tensile disposition for the application of tensile force to the damaged frame.

4. The apparatus of claim 3, wherein said structural ramp is provided with a plurality of openings, each of said openings being capable of anchoring an end portion of said chain means.

5. The apparatus of claim 1, wherein said power means can be vertically adjusted on said wheeled post.

6. The apparatus of claim 1, further comprising at least one additional wheeled post moveably mounted on said track.

7. The apparatus of claim 6, further comprising an upper, substantially horizontally disposed, cross-support pivotally, rotatably mounted at its end portions to at least two of said wheeled posts.

8. The apparatus of claim 1, wherein said structural ramp has a length less than the length of a conventional auto, being capable of receiving only an end portion of one-half an automobile thereon.

9. The apparatus of claim 4, wherein said structural ramp is provided with an attached frame alignment gauge.

10. The apparatus of claim 1, wherein said jack includes a piston, said flexible member comprises a chain, and said rigid means comprises a pull arm attached at least indirectly to said piston and encircling said post, said pull arm including at its end opposite to said piston a chain engaging slot, said chain being engaged in said slot at one portion of its length and to the damaged frame at another, opposite portion of its length when said jack is in its second, tensile force disposition, the movement of said piston causing the chain to be pulled in a direction away from the damaged frame.

11. The apparatus of claim 1, wherein said jack includes a piston, said flexible member comprises a chain, and said rigid means comprises a chain anchoring, slotted tip attached to said piston, said power means further including a bifurcated frame section in which said jack is pivotally mounted, said bifurcated frame section pivotally and vertically slidably mounting said jack on said post; said chain being engaged in said slotted tip at one portion of its length and to the damaged frame at another, opposite portion of its length when said jack is in its second, tensile force diposition, the movement of said jack causing the chain to be pulled in a direction away from the damaged frame.

12. The apparatus of claim 11, wherein said power means includes a roller guide rotatably mounted in said bifurcated frame section adjacent the end of said jack opposite said piston, said chain extending from said slotted tip down along said jack around said roller guide to the damaged frame when said jack is in its second disposition.

13. The apparatus of claim 12, wherein said roller guide and said jack are mounted for movement on the same horizontally disposed axis.

14. An apparatus for straightening damaged vehicle frames, comprising:
   a. a rigid structural ramp capable of supporting a vehicle thereon;
   b. a track at least partially encircling said ramp;
   c. at least two posts movably mounted on opposite sides of said track for movement on said track about said ramp;
   d. an upper support, cross member extending across and above said ramp and pivotally, rotatably mounted during use about a horizontally and laterally disposed axis at its end portions to and across said posts; and
   e. power means movably mounted on said upper support, cross member for imparting a force to the damaged frame at varying angles by pivoting said cross member with respect to said posts, said power means being easily moveable in both the horizontal and vertical planes about and above said ramp.

15. The apparatus of claim 14, wherein the mounts for said cross member to said posts comprise rotatable swivel brackets and are vertically adjustable in position on said posts.

* * * * *